(12) United States Patent
Godefroy et al.

(10) Patent No.: US 12,358,548 B2
(45) Date of Patent: Jul. 15, 2025

(54) CONTROL MODULE FOR A VEHICLE

(71) Applicant: Volvo Truck Corporation, Gothenburg (SE)

(72) Inventors: Manu Godefroy, La Bruguière (FR); Sébastien Nallet, Venerieu (FR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 18/461,565

(22) Filed: Sep. 6, 2023

(65) Prior Publication Data

US 2024/0083487 A1    Mar. 14, 2024

(30) Foreign Application Priority Data

Sep. 14, 2022   (EP) .................................... 22195554

(51) Int. Cl.
    B62D 1/00     (2006.01)
    B60Q 3/80     (2017.01)
    B60R 11/00    (2006.01)
    B60T 7/08     (2006.01)

(52) U.S. Cl.
    CPC ................. B62D 1/00 (2013.01); B60Q 3/80 (2017.02); B60R 11/00 (2013.01); B60T 7/08 (2013.01); *B60R 2011/0012* (2013.01)

(58) Field of Classification Search
    CPC .. B62D 1/00; B60Q 3/80; B60R 11/00; B60R 2011/0012; B60T 7/08; B60K 35/80; B60K 2360/139; B60K 2360/143; B60K 2360/1434; B60K 2360/145; B60K 2360/47; B60K 2360/573; B60K 2360/691; B60K 35/10
    See application file for complete search history.

(56) References Cited

U.S. PATENT DOCUMENTS

| 6,139,096 A * | 10/2000 | Anderson ............... B60N 3/002 297/188.1 |
| 10,434,914 B2 * | 10/2019 | Bittner .................... B60N 2/79 |
| 2012/0193930 A1 | 8/2012 | Wihinen et al. |
| 2016/0214621 A1 | 7/2016 | Baalu et al. |
| 2018/0334106 A1 | 11/2018 | Beauregard |
| 2020/0339041 A1 | 10/2020 | Quesnel |
| 2022/0024312 A1 | 1/2022 | Kim et al. |

FOREIGN PATENT DOCUMENTS

| CN | 202210706 U * | 5/2012 |
| DE | 102016220244 A1 | 4/2018 |
| KR | 1020140065294 A | 5/2014 |

OTHER PUBLICATIONS

English Translation of CN-202210706-U (Year: 2012).*
European Search Report for European Patent Application No. 22195554.5, completed Mar. 1, 2023, 3 pages.

* cited by examiner

*Primary Examiner* — Victor L MacArthur

(74) *Attorney, Agent, or Firm* — Withrow & Terranova, PLLC

(57) ABSTRACT

A remote control module for a vehicle, the remote control module comprising a base comprising a housing for a nomadic device configured to provide access to and control at least one first functionality of the vehicle; a control device configured to control a second functionality of the vehicle; and a fastening device for fastening the base to a seat frame of the vehicle.

9 Claims, 5 Drawing Sheets

[Fig. 1]
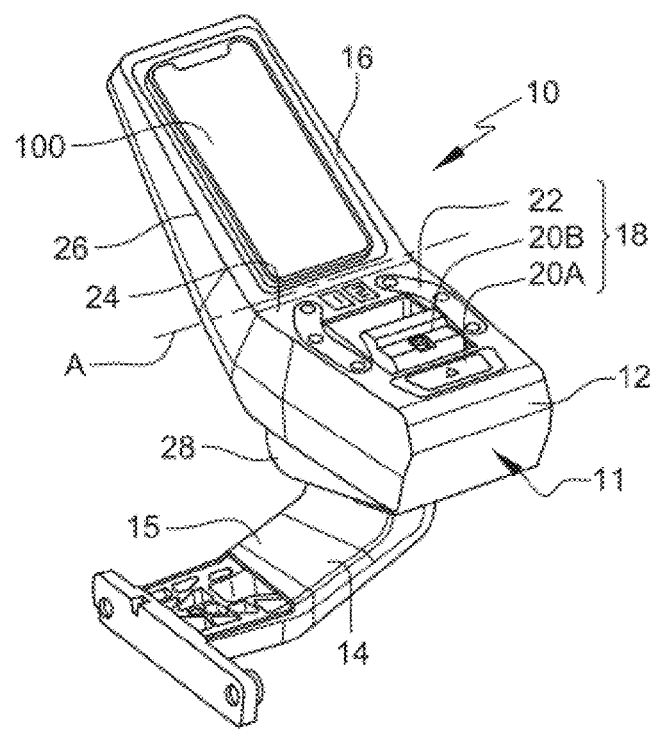

[Fig. 2]
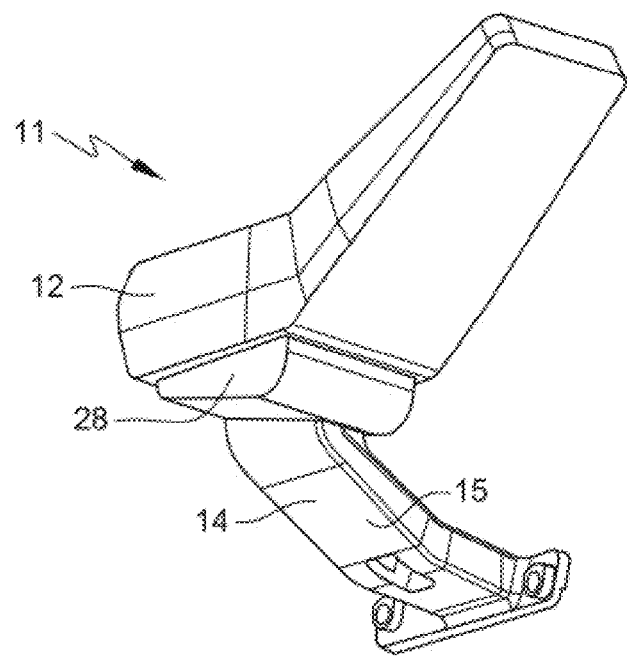

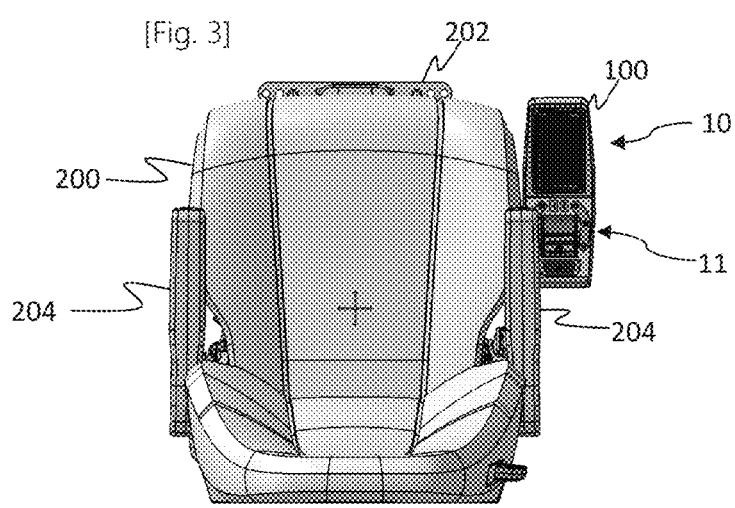

[Fig. 4]
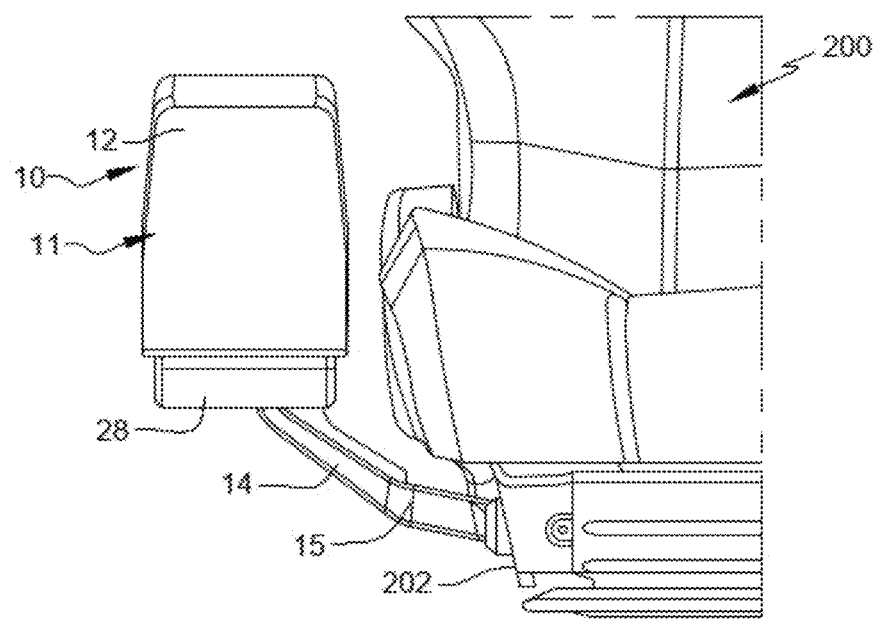

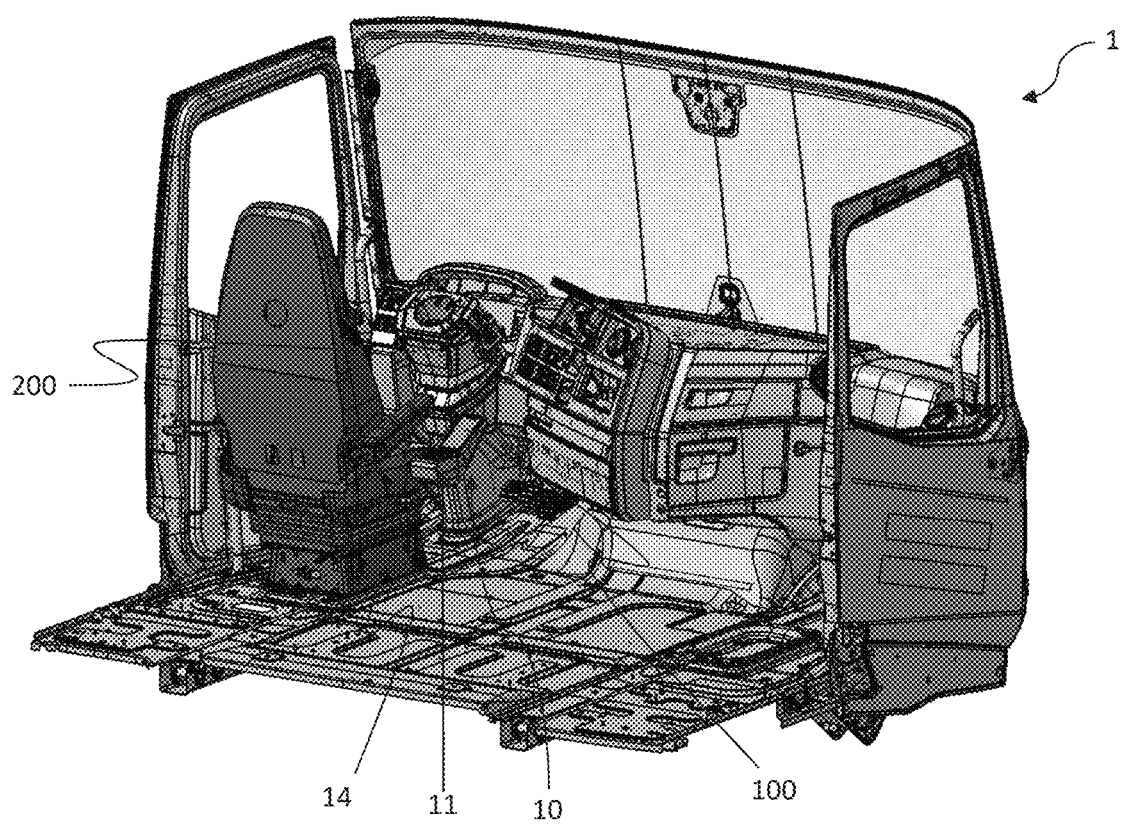
[Fig. 5]

CONTROL MODULE FOR A VEHICLE

RELATED APPLICATIONS

The present application claims priority to European Patent Application No. 22195554.5, filed on Sep. 14, 2022, and entitled "CONTROL MODULE FOR A VEHICLE," which is incorporated herein by reference in its entirety.

TECHNICAL FIELD

The disclosure relates generally to control modules for vehicles and more precisely for vehicles with autonomous driving system. In particular aspects, the disclosure relates to a remote control module for a vehicle.

The disclosure can be applied in heavy-duty vehicles, such as trucks, buses, and construction equipment. Although the disclosure will be described with respect to a particular vehicle, the disclosure is not restricted to any particular vehicle.

BACKGROUND

In most trucks, a driver's seat can be moved away from the driving area (steering wheel and pedals) of the truck. This function coupled with autonomous driving of the truck allows the driver to engage in other activities than driving, such as resting, working or relaxing. When the driver's seat is away from the driving area, the driver cannot easily access the dashboard to control vehicle functionalities such as temperature, radio, or navigation.

It is known to equip a vehicle with a driver's seat comprising a specific armrest comprising a remote control module configured to steer one or several functionalities of the vehicle, such as the opening of a window, the control of a ventilation system, or the like.

However, these equipment cannot be adapted to an existing seat of a vehicle. Moreover, they are bulky and cannot be used if the armrest is raised.

SUMMARY

An object of the invention is to provide an improved remote control module for a vehicle, which remote control module solve at least the previous problems of the prior art.

According to a first aspect of the disclosure, the remote control module comprises:
A base comprising:
  A housing for a nomadic device configured to provide access to and control at least one first functionality of the vehicle;
  A control device configured to control a second functionality of the vehicle;
A fastening device for fastening the base to a seat frame of the vehicle.

The first aspect of the disclosure may seek to provide a global control module that can be easily accessed by a driver regardless of the position of the driver's seat and of the armrests of the driver's seat. The remote control module can allow the driver to control vehicle functionalities when the driver's seat is moved away from the driving area. A technical benefit may be that the remote control module can be adapted to any vehicle. More precisely, the remote control module may be adapted to any existing driver's seat.

The remote control module may provide access to all vehicle functionalities.

Regardless of the position of the driver's seat, the driver can control any functionality of the vehicle.

In some examples, the at least one first functionality is a comfort functionality of the vehicle.

A comfort functionality is a function that is not mandatory for the vehicle driving itself. It includes all other functionalities such as opening of the windows, control of the ventilation system, control of the temperature, control of the radio, or control of the navigation.

In some examples, the second functionality is a safety functionality of the vehicle.

A safety functionality include normal driving functionalities in addition to crash avoidance functionality. A safety functionality is a functionality that allows normal driving and/or crash avoidance functionality and/or a crash protection functionality, such as hazard light control or electronic park brake lever control.

A technical benefit may include that the remote control module allow to control comfort and safety functionalities.

In some examples, the control device comprises a mechanical device configured to steer the second functionality of the vehicle. A technical benefit may include to easily and quickly control the second function.

In some examples, the mechanical device comprises a hazard light control button and/or an electronic park brake lever.

In some examples, the control device comprises a touch-sensitive surface configured to define a shortcut to the at least one first function. A technical benefit may include to easily and quickly control the at least one first function.

In some examples, the nomadic device is configured to provide access to and control at least two first functionalities of the vehicle and the control device comprises a touch-sensitive surface configured to define at least one shortcut to at least one of the at least two first functionalities of the vehicle.

In some examples, the touch-sensitive surface is made by plastronic (also known as molded interconnected device). A technical benefit may include the integration of electronic circuits directly on injection molded thermoplastic parts.

In some examples, the base comprises a face comprising the control device and the housing for the nomadic device. A technical benefit may include to use the control device and the nomadic device in the same time, without further manipulation of the remote control module.

In some examples, the face is curvilinear and comprises an inflection axis that separates the control device and the housing for the nomadic device. A technical benefit may include to provide ergonomic access to the functionalities of the remote control module.

In some examples, the housing for the nomadic device comprises an induction charger for charging the nomadic device.

In some examples, the fastening device is foldable. A technical benefit may include to reduce the space requirement of the remote control module when not in use.

In some examples, the fastening device comprises a bracket configured to adjust a position of the base. A technical benefit may include to provide ergonomic access to the functionalities of the remote control module.

According to a second aspect of the disclosure, these or other objectives are achieved by a remote control system for a vehicle, the remote control system comprising:
A nomadic device configured to provide access to and control at least one first functionality of the vehicle; and
A remote control module as described above.

The nomadic control device may be used from everywhere in the vehicle. A technical benefit may include to have access to and control the at least one first functionality of the from everywhere in the vehicle, especially from the living area, thanks to the nomadic control device.

In some examples, the nomadic device is configured to provide access to and control at least two first functionalities of the vehicle.

The nomadic device can comprise a simplified interface allowing the driver to control all the functionalities of the vehicle.

In some examples, the nomadic device is a mobile telephone.

According to a third aspect of the disclosure, these or other objectives are achieved by a vehicle comprising the remote control module as described above.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical effects and corresponding advantages.

BRIEF DESCRIPTION OF THE DRAWINGS

With reference to the appended drawings, below follows a more detailed description of aspects of the disclosure cited as examples.

FIG. 1 is a perspective front view of a remote control system for a vehicle, according to one example.

FIG. 2 is a perspective rear view of a remote control module for a vehicle, according to one example.

FIG. 3 is a top view of a driver's seat comprising the remote control system of FIG. 1.

FIG. 4 is a partial front view of the driver's seat of FIG. 3, showing fastening device of the remote control system to the driver's seat.

FIG. 5 is an example of the vehicle displayed in FIG. 1.

DETAILED DESCRIPTION

Aspects set forth below represent the necessary information to enable those skilled in the art to practice the disclosure.

FIG. 1 show a remote control system 10 for a vehicle 1, according to one example. An example of such a vehicle 1 is represented at FIG. 5. The exemplary vehicle 1 of FIG. 5 is a truck represented by its cabin, but the invention may be implemented on any other kind of vehicle 1.

The remote control system 10 comprises a remote control module 11 configured to house a nomadic device 100, such as a mobile telephone.

As illustrated in FIG. 1, the remote control system 10 comprises the nomadic device 100. The nomadic device 100 can be disposed on the remote control module 10. The nomadic device 100 is configured to provide access to and control at least one first functionality of the vehicle 1. For example, the nomadic device can be a smartphone or a portable tablet.

As illustrated in FIG. 1 and FIG. 2, the remote control module 11 comprises a base 12 and a fastening device 14 for fastening the base 12 to a seat frame 202 of a driver's seat 200 of the vehicle 1. The remote control module 11 can be fastened to any existing seat.

FIG. 3 and FIG. 4 illustrate a driver's seat 200 comprising a seat frame 202. The remote control system 10 can be fastened to the seat frame 202. More precisely, the remote control module 11 can be fastened to the seat frame 202. The base 12 of the remote control module 11 can be fastened to the seat frame 202 via the fastening device 14.

The driver's seat can comprise at least an armrest 204. The remote control module 11 can be configured to be decoupled from the armrest 204. The advantage is that the remote control module 11 does not impact the armrest surface. The entire resting surface of the armrest is preserved. Moreover, the initial driving posture and the lifting function are preserved. No preliminary action is necessary to access the remote control module 11 if the armrest is raised.

FIG. 1 shows that the base 12 comprises a housing 16 for the nomadic device 100. The housing 16 can be a nomadic device holder. The housing 16 can be configured to maintain the nomadic device 100 in a removable manner.

The base 12 further comprises a control device 18 configured to control a second functionality of the vehicle 1.

The at least one first functionality can be a comfort functionality of the vehicle 1, such as opening of the windows, control of the ventilation system, control of the temperature, control of the radio, or control of the navigation. The nomadic device 100 can be configured to provide access to and control at least two first functionalities of the vehicle 1.

The second functionality can be a safety functionality of the vehicle, such as hazard light control or electronic park brake control.

The control device 18 can comprise a mechanical device 20A, 20B configured to steer the second functionality of the vehicle 1. The mechanical device 20A, 20B can comprise a hazard light control button 20A and/or an electronic park brake lever 20B.

The control device 18 can comprise a touch-sensitive surface 22 configured to define a shortcut to the at least one first function.

If the nomadic device 100 is configured to provide access to and control at least two first functionalities of the vehicle, the touch-sensitive surface 22 can be configured to define at least one shortcut to at least one of the at least two first functionalities of the vehicle. The touch-sensitive surface 22 can be configured to define at least two shortcut to the at least two first functionalities of the vehicle.

As illustrated in FIG. 1, the touch-sensitive surface 22 can be configured to define six shortcuts.

The touch-sensitive surface 22 can be made by plastronic, also known as molded interconnected device.

The base 12 can comprise a face 24 comprising the control device 18 and the housing 16 for the nomadic device 100. Therefore, the remote control module 11 can allow simultaneous use of the nomadic device 100 and the control device 18.

The face 24 can be curvilinear. The face 24 can comprise an inflection axis A that separates the control device 18 and the housing 16 for the nomadic device 100.

The housing 16 for the nomadic device 100 can comprise an induction charger 26 for charging the nomadic device 100.

The fastening device 14 can be foldable. The fastening device 14 can be configured to adjust a position of the remote control module 11. The fastening device 14 can be configured to adjust the position of the remote control module 11 on a driver's seat 200 of the vehicle, in one or more directions to optimize the ergonomic position of the driver. The fastening device 14 can comprise a bracket 15 configured to adjust the position of the remote control module 10.

The fastening device 14 can comprise a pivot and/or a translation link 28 configured to adjust the position of the remote control module 10 in one or several directions. The fastening device 14 can be configured to be screwed to the frame seat 202.

According to an aspect, the invention provides a vehicle 1 comprising the remote control module 11 according to any of embodiments described herein above.

The terminology used herein is for the purpose of describing particular aspects only and is not intended to be limiting of the disclosure. As used herein, the singular forms "a", "an" and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

The term "front", in relation to a driver's seat means the part of the driver's seat proximate the driving area. The term "rear" refers to the part opposite the front.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A remote control module configured for use on a vehicle, the remote control module comprising:
   a base comprising:
      a housing configured for holding a nomadic device, the housing being configured to maintain the nomadic device in a selectively removable manner, the nomadic device configured to provide access to and control of at least one first functionality of the vehicle both when supported in the housing and when removed from the housing; and
      a control device configured to control a second functionality of the vehicle, the control device comprising a mechanical device configured to steer the second functionality of the vehicle; and
   a fastening device for fastening the base to a seat frame of the vehicle,
   wherein the mechanical device comprises a hazard light control button and/or an electronic park brake lever.

2. The remote control module of claim 1, wherein the at least one first functionality is a comfort functionality of the vehicle.

3. The remote control module of claim 1, wherein the base further comprises a face comprising the control device.

4. The remote control module of claim 3, wherein the face is curvilinear and comprises an inflection axis that separates the control device and the housing configured for holding the nomadic device.

5. The remote control module of claim 1, wherein the housing configured for holding the nomadic device comprises an induction charger for charging the nomadic device.

6. The remote control module of claim 1, wherein the fastening device is foldable.

7. The remote control module of claim 1, wherein the fastening device comprises a bracket configured to adjust a position of the base.

8. A remote control system for a vehicle, the remote control system comprising:
   the remote control module of claim 1; and
   the nomadic device.

9. A vehicle comprising the remote control module of claim 1.

* * * * *